UNITED STATES PATENT OFFICE.

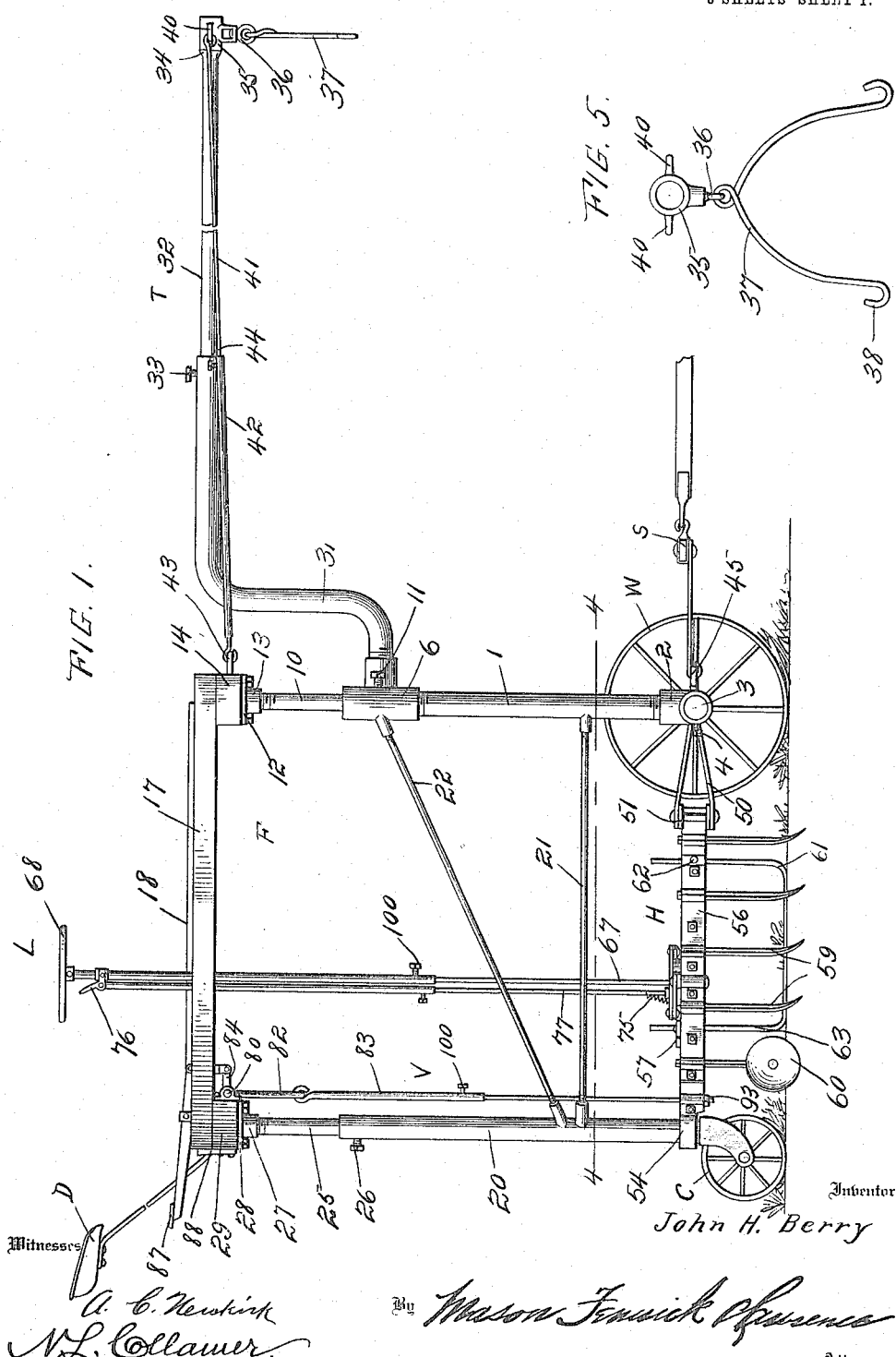

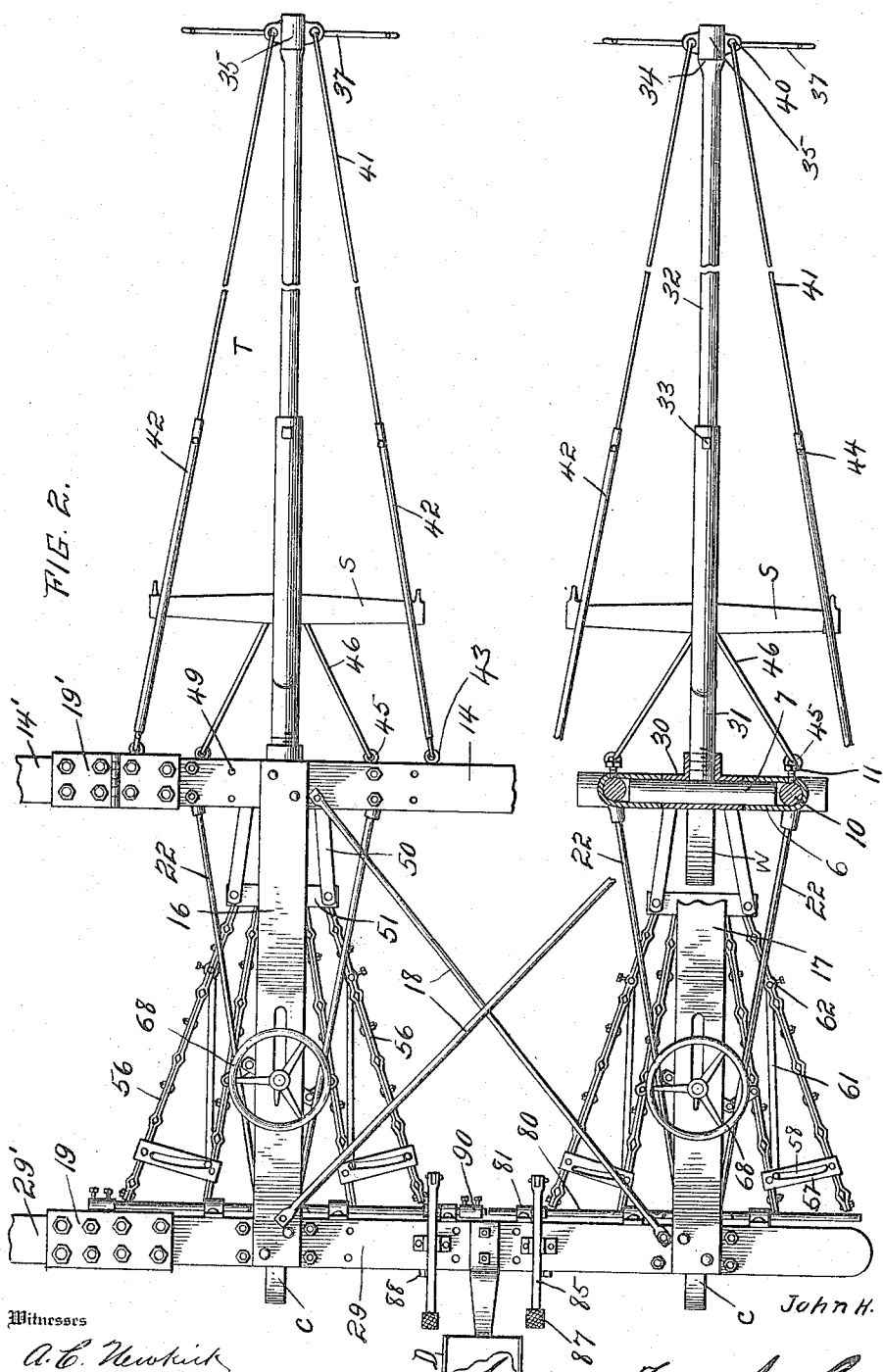

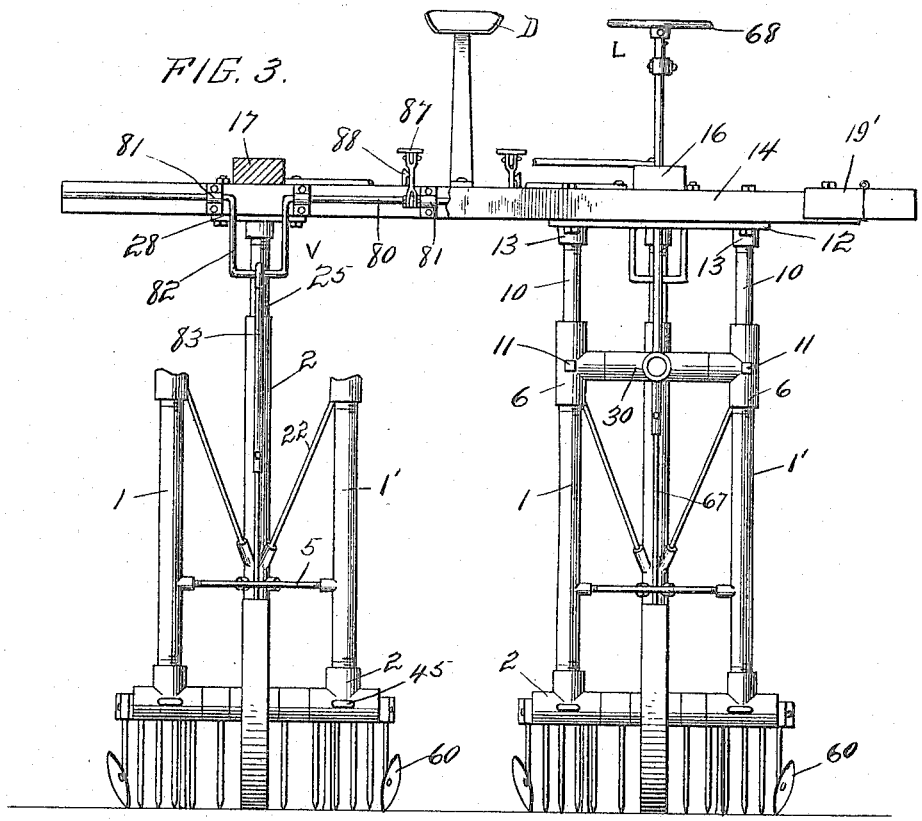
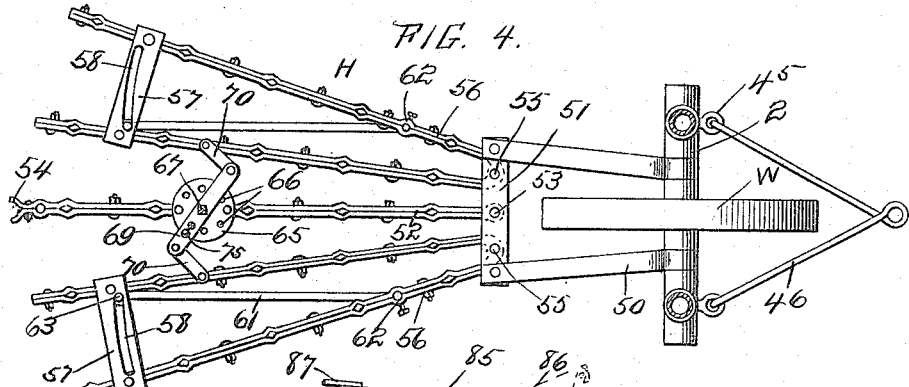

JOHN H. BERRY, OF OWENSBORO, KENTUCKY.

CULTIVATOR.

1,135,756.    Specification of Letters Patent.    Patented Apr. 13, 1915.

Application filed May 18, 1914. Serial No. 839,424.

*To all whom it may concern:*

Be it known that I, JOHN H. BERRY, a citizen of the United States, residing at Owensboro, in the county of Davis and State of Kentucky, have invented certain new and useful Improvements in Cultivators; and I do hereby declare the following to be a full, clear, and exact description of the invention, such as will enable others skilled in the art to which it appertains to make and use the same.

This invention relates to plows, and more especially to cultivators; and the object of the same is to produce a wheeled cultivator of the straddle-row type. Heretofore cultivators of this character have been built with their cultivating elements in gangs or sections, more or less flexibly connected with the framework whereby they will permit a certain lateral motion, and each traveling between two rows of plants and intended to cultivate the soil to a greater or lesser extent.

The general aim of the present invention is to build a straddle-row cultivator in sections or units whereof I have illustrated but two in the drawings, although it is obvious that a greater number could be employed, to have each unit a complete machine drawn rigidly and straight forward by the horse or other source of power, with its cultivating elements traveling in rear of its supporting wheel and connected with elevating mechanism so that it may be raised to pass over stones or other obstructions, and with the various units connected by means of a framework which is adjustable vertically so that the framework (which takes the place of the arch ordinarily employed in machines of this type) may be set higher and higher as the season progresses and the plans grow.

In the preferred embodiment of my invention as illustrated in the accompanying drawings, many details are employed which are susceptible of modification and others are shown and hereinafter described and claimed.

In the said drawings:—Figure 1 is a side elevation of this machine complete; Fig. 2 is a plan view partly in section, and this view has been used to show how an additional unit or section may be attached to the framework; Fig. 3 is a front elevation with the tongues removed, part of the framework being broken away; Fig. 4 is an enlarged plan view of one of the cultivating elements, being a section taken on the line 4—4 of Fig. 1; Fig. 5 is an elevation of one of the hame yokes; Fig. 6 is an enlarged sectional detail of one of the foot levers hereinafter referred to.

In the drawings I have used letters to designate the parts broadly. That is to say, F designates the frame or framework mounted on main wheels W and supported at its rear by caster wheels C, T are the tongues so-called in the present case and S are the single trees disconnected from each other as will be set forth, D is the driver's seat, and V the vertical and L the lateral adjusting mechanisms which stand within reach of the driver. These adjusting mechanisms are connected with the units, each having a cultivating element H which travels between the main and caster wheels and the units are attached to and drawn by the main axle.

The frame or framework includes the upright units which are alike, and an overhead structure connecting as many of the units as I employ. The units themselves are preferably built of tubes and couplings as far as possible, for the sake of lightness, cheapness, rigidity, and adjustability, and for the further reason that this material is readily found in the market. Each unit comprises a pair of front posts 1 and 1′ having T-couplings 2 at their lower ends through which passes a tubular or solid axle or pin 3 preferably rendered removable by means of set screws 4, best seen in Fig. 1; and on this axle between the heads of the two couplings is rotatably mounted the supporting wheel W which needs no further description, except that its relative size is well indicated in the drawings. From these couplings the posts rise in parallelism, are suitably braced at 5, and carry T-couplings 6 at their upper ends, the shanks of these couplings projecting toward each other and receiving a pin 7. It will be seen from Fig. 2 near the lower side thereof that the extremities of this pin terminate short of the heads of the T-couplings 6. The purpose of this detail of structure is to permit upright rods or pipes 10 to pass down through said couplings 6 and into the posts 1 and 2, and these rods are held adjustably therein by means of set screws 11. When the latter are loosened the rods may be raised as best seen in Fig. 1. Each pair of rods is connected at its upper end by a plate 12 preferably having sockets 13 into which the rods are screwed, and in the present illustration the two plates 12 are connected by a crossbeam 14 which forms the front bar of the superstructure of the frame-work and may be of wood, although of course, tubes or pipes could also be employed. Therefore when the set screws 11 are loosened, the forward portion of the superstructure can be moved higher or lower according to the condition of the plants to be cultivated, after which the set screws are tightened up again.

The rear end of each unit is preferably supported by means of a caster wheel C whose details of construction need not be elaborated. The shank of this wheel is mounted in the lower end of an upright post 20 which by preference is a tube or pipe of the same size as either front post 1 or 2, and this rear post 20 is braced to the front post as shown at 21 and 22, preferably by other and finer tubes although possibly by rods or strips of metal. The details of the braces need not be elaborated, excepting that all parts of each unit are separate from all parts of every other unit. The upper end of the rear post 20 receives a rod or pipe 25 adjustably mounted therein by means of a set screw 26, its upper end entering a socket 27 carried by and beneath a plate 28, much the same as the upper end of either front rod 10; and this plate is secured beneath the rear cross-beam 29 of the superstructure which also may be of wood like the front cross-beam 14. The framework is completed by longitudinal beams 16 and 17 overlying the cross-beams 14 and 29 and secured thereto in any suitable manner, and as best seen in Fig. 2, the superstructure may be held rigid by diagonal braces 18. I may say at this point that another unit similar to either of those described herein may be added at one side, or perhaps one at each side of the machine illustrated. Fig. 2 shows that clamps 19 or hinges 19' of any suitable character may be applied to either extremity of each crossbeam, and these clamps may connect other cross-beams 14' and 29' with the ones already described, these additional cross-beams carrying another unit in the same manner as above set forth. Thus it will be quite possible to amplify this machine to a considerable extent so that three or four or possibly a greater number of the strips of ground between standing rows of plants could be cultivated simultaneously. It will be obvious that with two units as shown, the two strips of land between three rows of plants will be completely cultivated; or that with three units the three strips of land between four rows of plants would be cultivated. I may say also at this point that the driver's seat D is by preference adjustably mounted on the rear cross beam 29 at about the center of the superstructure. If the latter overlie two units as shown the seat will be midway between two longitudinal beams 16 and 17; if the machine comprise three units, the seat would be mounted upon the rear end of the beam 16 in Fig. 2.

Each tongue T is by preference also made of metal tubing as shown. Rotatably mounted on the pin 7 is the head of a T-coupling 30 (see lower portion of Fig. 2) into whose shank is screwed a tube 31 which, as shown in Fig. 1, leads forward and then upward and then again forward—the intention being that it will pass over the horse's rump without striking his back, no matter what his height. Into the front end of this tube is telescoped a smaller tube or rod 32 which is rendered adjustable by means of a set screw 33, and near the front end of the rod it has a shoulder 34. Over the rod forward of this shoulder is slipped a ring 35, best illustrated in Fig. 5, and swiveled at 36 to the lower side of this ring is a hame yoke, 37, whose lower ends are hooked at 38 to engage with rings in the hames or with rings on the collar of the horse. The swivel permits the animal to turn his head from side to side as may be desirable, and yet the adjustment by means of the set screw 33 holds the rod 32 forward so that the shoulder 34 is borne over against the ring 35. The latter carries lateral eyes 40 connected by telescopic rods or tubes 41 and 42 with points 43 on the front cross-beam 14, and these rods are adjustable between their ends as by means of set screws 44 or equivalent devices. They serve as braces to hold the front end of the tongue T against lateral movement, and also as guy wires to draw the ring 35 at the upper end of the hame yoke back into close contact with the shoulder 34 and prevent its slipping off the forward end of the tongue. Therefore, if the horse employed should have a rather long body or short body, or if for any other reason an adjustment of the position of the hame yoke is desired, the entire forward portion 32 of the tongue can be slid within or into the rear portion 31 thereof and held in adjusted position by means of the set screw 33; and meanwhile the rods 41—42 can be correspondingly adjusted in length at the points 44. These rods serve also the additional purpose of sustaining the front end of the tongue, as will be seen by an inspection of Fig. 1. Their rear ends are connected at the points 43 with the front cross-beam 14 which is susceptible of vertical adjustment as has been described, whereas the rear end of the tongue is supported by a pin 7 connecting the front posts 1 and 1' at a considerably lower point. The machine is shown in Fig. 1 with the superstructure adjusted about level with the front end of the tongue and in this case the rods 41—42 stand substantially horizontal. If the superstructure were lowered the rods would incline upward from it, whereas if the superstructure were adjusted higher the rods would incline downward; but at any point in its adjustment these supporting and bracing rods not only sustain the front end of the tongue but prevent its lateral movement.

To the front sides of the T-couplings 2 of each unit are connected eye bolts 45 or similar devices which carry a brace 46 of substantially V-shape as seen in Fig. 4 so that it will pass astride the front wheel W, and the propelling power is hitched to the angles of these braces. If this machine be drawn by horses, single-trees S will be used as shown in the drawings, and there should be a horse for each unit. I may say that, while the distance between rows of such plants as will be cultivated by this machine is usually the same or very nearly the same, it is possible to adjust the relative position of the units by bolting the plates 12 and 28 at different points to the cross-beams 14 and 29, and for this purpose holes 49 may be formed in the beams as seen in Fig. 2.

While I reserve the right to modify the construction of the element H which is employed in connection with each unit of this machine, I have illustrated my preference in the drawings attached. Referring more particularly to Figs. 1 and 4, straps 50 connect the axle at the ends of the T-couplings 2 with a pair of cross plates 51 standing in rear of the main wheel W and directly behind its axle, and between these plates extends the front end of the central member 52 of the element H, said front end being rigidly held in position by a bolt 53. Its rear end may be forked as shown at 54 and the fork arms will pass astride the rear post 20 to prevent side movements of this member and of the straps 50 and plates 51, while yet permitting said member and the entire element to have a slight vertical movement around the front axle as a pivot. Through said plates pass also other bolts 55, on each of which is mounted the front end of a U-shaped member 56 whose arms are connected near their rear by a brace 57 having a slot 58 for a purpose to appear. The central member 52 and the two arms of the side members 56 will carry teeth or blades 59 whose details of construction may be left to the manufacturer and user, and these teeth or blades are by preference adjustably mounted in any suitable way. At the rear end of each outer arm of the side members 56 I also by preference mount a disk cultivator 60 whose purpose as is well known is to throw a little soil around the plants in the row adjacent. For causing the disk and the lower ends of the teeth to embed the ground to a proper degree, I preferably employ runners 61 whereof each element may have two. Each runner is made of a stout rod whose front end is upturned and adjustably mounted as at 62 in one of the members of the element and whose rear end is upturned as at 63 and plays loosely in the slot 58, or rather it might be stated that the runner is dragged directly forward from the point 62, in rear of which the point 63 trails along the line of motion, whereas the slot 58 is provided in order to permit the lateral adjustment of the U-shaped member 56. Such lateral adjustment, which of course controls the width of the element H whereby it can be set to cultivate all of the distance between the rows of standing plants, is effected by means of a double toggle as seen in Fig. 4. Mounted fast on the central member 52 is a plate or disk 65 having a series of perforations 66, and set in a hole in the center of this disk is an upright shaft 67 having a lever or hand wheel 68 at its upper end within reach of the driver sitting on the seat D. Fast on the shaft 67 just above the disk is a double lever or link 69 whose extremities are connected by single links 70 with the inner arms of the U-shaped or side members 56. Projecting through an eye in the lever 69 is an upright rod 77 rising alongside the shaft 67 and connected with it adjacent the handle or wheel 68 by means of a thumb latch 76; and a spring 75 draws this rod normally downward so as to project its lower extremity into one of the perforations 66 in the disk 65. When now the driver desires to adjust the width of an element he first manipulates the thumb latch 76 to lift the tip of the rod 77 out of the perforation in the disk, then he turns the lever or wheel 68 to actuate the double toggle and to swing the side members 56 outward from or inward toward the central member 52, and finally he releases the latch so that the tip of the rod 77 engages another perforation 66 and locks the parts in adjusted position. Meanwhile if the side members are swung inward, it will be clear that the upturned rear ends 63 of the runners 61 will travel outward within the slots 58, because their tendency is ever to trail directly in rear of their upturned front ends 62.

Anticipating the possible use of this machine on land having more or less obstructions such as stumps or stones, and in connection with elements whose teeth may be quite close or fine, I make provision for lifting any harrow so as to safeguard it against injury, and the same mechanism will be utilized to hold the element entirely off the ground when the machine is driven from point to point. My preferred embodiment of this idea is to mount a rock shaft 80 in bearings 81 along the forward side of the rear cross-beam 29, and provide it with a suitable crank 82 as perhaps best seen in Fig. 6. The crank is connected by a link or rod 83 with the central member 52 near its rear end, and the rock shaft carries a crank arm 84 which is connected with a foot lever 85 pivoted at 86 on the beam 29 and having a pedal 87 adjacent the driver's seat. When now the driver observes that one of the elements is approaching an obstruction, he has but to depress the pedal, and this motion rocks the shaft 80 and raises the element as the loose engagement of its fork 54 with the post 20 permits. Any suitable means may be provided, such as the catch 88, for holding the parts in this position when the machine is being driven over the roadway. I provide one of these vertical adjusting mechanisms V for each unit, although I need describe but one. If two units are employed as seen in Fig. 2, the adjacent ends of the two rock shafts 80 may be connected by a coupling 90 as indicated at the center of Fig. 2, or if the coupling is omitted the driver could use either foot to raise either harrow H independently of the other. I will say at this point that when additional units are employed, their vertical adjusting mechanisms V will be connected with the rock shaft immediately in front of the driver in a similar manner. The lower end of the rod 83 passes through the central member 52 and is headed as shown at 93 in Fig. 1, the purpose being to permit the rise of the element automatically in case it passes over an obstruction; but this could be accomplished by substituting a chain for the rod 83 or in any other suitable way.

Thus it will be seen that I have constructed a machine wherein two or more units may be employed simultaneously for the complete and independent cultivation of the paths of ground between rows of plants or seed, or wherein the units might be set side by side under the superstructure and the elements might be distended so that the entire surface of the ground could be cultivated—the thoroughness of the cultivation depending on the setting of the cultivator teeth and the kinds of teeth or blades employed. My machine is therefore susceptible of use in preparing the ground for seeding as well as for cultivating the ground after it has been seeded or after the plants have begun to grow, and it is susceptible of use with various kinds of plants and throughout all stages of their development. I would by preference adjust it between three and four feet high at first and this is the reason why the tongues are given the upward bend as shown at 31 in Fig. 1. As the plants become taller and taller, the superstructure is raised by lengthening the various posts under the adjustments permitted, and as this occurs the adjusting mechanisms must be lengthened to keep pace with the adjustments of the superstructure. For this purpose the various rods are made telescopic and provided with set screws as indicated by the numeral 100 in Fig. 1 and not necessary to describe in detail. Meanwhile also the rods 41—42 will need adjustment so that the front ends of the tongues will be held above the horse's collar at the proper height. Many, if not most of the plants of the character which will doubtless be treated with this machine are now arranged in straight rows and of almost uniform width, and it is the purpose of this machine to cultivate the strips of ground between three or more rows simultaneously by the use of two or more units, connected by a superstructure, and each unit drawn straight ahead by a horse entirely separate from the other horse or horses. This is the reason why I employ the tongue which is connected at its rear end with the front posts in such manner that it has no side movement, and its points of adjustment are only to accommodate it to horses of various sizes. It might be said that the steadiness by which one animal travels in his path and draws the unit behind him is to an extent imparted to the other animal or animals, because every unit is connected by the superstructure with every other unit and no tongue has any lateral movement. It is well known to those who have cultivated corn and other farm products that unless the horse is well trained he is liable to swerve from side to side and step on the tender plants, and the advantage of using a structure in which this is obviated as far as possible is therefore apparent.

I do not wish to be limited to the details of construction, except as set forth in the following claims, and the proportions and materials of parts are obviously susceptible of modification to a considerable degree.

What I claim is:

1. In a cultivator, the combination with a superstructure including cross beams; of a series of units independently and adjustably disposed beneath said cross beams and each carrying its cultivating element, a tongue projecting forward from each unit, means for adjusting the height of the superstructure, and adjustable braces between the front end of the tongue and the front beam of the super-structure.

2. In a cultivator, the combination with a super-structure; of a series of units independently disposed beneath said superstructure and each carrying its cultivating element, a tongue projecting forward from each unit and having a T-coupling at its rear end and a shoulder near its front end, a cross pin in the unit on which said T-coupling is rotatably mounted, a ring embracing the tongue forward of said shoulder, means for vertically adjusting the superstructure with respect to the unit, and adjustable braces connecting the superstructure with said ring.

3. In a cultivator, the combination with a plurality of members whereof each includes a pair of front tubular posts, a single rear tubular post, braces connecting the posts, wheels supporting said posts, a cultivating element trailing from the front posts, rods adjustable vertically in the upper ends of all posts, and plates on said rods; of a superstructure including a cross beam overlying all of the front posts, a second cross beam overlying all of the rear posts, said plates being respectively attached to said beams, longitudinal beams connecting the cross beams, and tongues for the individual units braced from the front cross beams.

4. In a cultivator of the class described, the combination with a plurality of units whereof each comprises a pair of longitudinally adjustable front posts, a single longitudinally adjustable rear post, T-couplings at the lower ends of the front posts, an axle through said couplings, a main wheel mounted on the axle, straps leading to the rear from said main wheel, cross plates connecting said straps in the rear of said wheel, and a cultivating element trailing from said cross plates; of a super-structure including cross beams overlying and secured to the upper members of the front posts and rear posts respectively, rigid means for connecting said cross beams in spaced relation to each other, and means for adding additional units.

5. In a straddle-row cultivator, the combination with a plurality of units whereof each includes a main axle at its front end, and a super-structure connecting said units; of a cultivating element for each unit, connections between the main axle and the element permitting the rise and fall of the latter, a crank shaft rotatably mounted in the superstructure and having a pedal, and connections between its crank and the rear end of the element.

6. In a straddle-row cultivator, the combination with a plurality of units whereof each includes a main axle at its front end and posts rising therefrom, a single post at its rear end, and a main wheel on said axle; of a cultivating element connected at its front end with said axle and standing between the wheels, the rear end of said element having a fork loosely embracing the rear post, a super-structure carried by said posts, a manually operable crank shaft mounted on the super-structure, and connections between its crank and said element for raising and lowering the latter.

7. In a straddle-row cultivator, the combination with a plurality of units whereof each comprises a pair of front tubular posts, T-couplings on their lower ends, a main axle through said couplings, means for holding the axle in place, a wheel on the axle between the couplings, straps leading from the axle to the rear of the wheel, a cultivating element trailing from said straps, and means for supporting the rear end of the unit; of a super-structure mounted across all units, means for rendering it vertically adjustable of the front posts thereof, a V-shaped brace whose arms are connected with each pair of T-couplings and draft mechanism connected with the angle of said brace independent of any other unit.

8. In a straddle-row cultivator, the combination with a plurality of units whereof each includes telescopic posts, wheels supporting the front and rear of the unit, and a cultivating element hingedly connected to the axle of the front wheel of a super-structure connecting the upper members of all of the adjustable posts, mechanisms for raising the element including upright rods adjustable in their length, and means at the upper ends of said rods for the manual manipulation thereof.

In testimony whereof I affix my signature in presence of two witnesses.

JOHN H. BERRY.

Witnesses:
EDWARD T. FENWICK,
NEWTON L. COLLAMER.

Copies of this patent may be obtained for five cents each, by addressing the "Commissioner of Patents, Washington, D. C."